United States Patent [19]

Stanevich et al.

[11] Patent Number: 5,170,017
[45] Date of Patent: Dec. 8, 1992

[54] CONNECTOR AND METHOD FOR SEALED PASS-THROUGH OF INSULATED ELECTRICAL CONDUCTORS

[75] Inventors: Kenneth W. Stanevich, New Baltimore; David L. Gimbutis; Ezio D. Lucci, both of Shelby Township, Macomb County, all of Mich.

[73] Assignee: Augat Inc., Mt. Clemens, Mich.

[21] Appl. No.: 656,560

[22] Filed: Feb. 15, 1991

[51] Int. Cl.[5] .................. H01B 17/26; H01B 17/30
[52] U.S. Cl. .............................. 174/153 G; 174/151; 174/152 G; 174/153 R
[58] Field of Search ................. 174/153 G, 65 R, 151, 174/152 G, 153 R; 439/271, 274, 275, 276; 248/56

[56] References Cited

U.S. PATENT DOCUMENTS

| | | | |
|---|---|---|---|
| 3,825,669 | 7/1974 | Korner et al. | 174/151 |
| 4,180,297 | 12/1979 | Abrams | 174/153 G |
| 4,289,924 | 9/1981 | Pearce, Jr. et al. | 174/152 G |
| 4,389,021 | 6/1983 | Coldren | 339/126 R |
| 4,492,421 | 1/1985 | Ito | 439/271 |
| 4,557,144 | 12/1985 | Lucchini | 73/313 |
| 4,607,469 | 8/1986 | Harrison | 439/271 X |
| 4,797,513 | 1/1989 | Ono et al. | 174/153 G |
| 4,822,294 | 4/1989 | McClearn | 439/274 |
| 4,982,055 | 1/1991 | Pollack et al. | 174/151 |

FOREIGN PATENT DOCUMENTS

1545869 11/1968 France ................. 174/153 G

Primary Examiner—Leo P. Picard
Assistant Examiner—Hyung S. Sough
Attorney, Agent, or Firm—Weingarten, Schurgin, Gagnebin & Hayes

[57] ABSTRACT

A connector for passing continuous insulated electrical conductors such as pins or multi-stranded wire through a surface or bulkhead, while preventing leakage of liquids and gases along the conductors, especially between gaps in the strands. An exemplary connector comprises a body having seal-zone openings in which a sealant is applied and cured around a compressed bared section of multi-stranded wire. The body contains strain relief members adjacent to the sealed openings to provide longitudinal as well as transverse strain relief. A sealant member and radially spaced clasps are located around the sealed openings and strain relief members so that the connector may be removably twist-locked onto a bulkhead without disturbing the sealed wires. A method is defined for achieving the sealed pass-through of electrical conductors.

25 Claims, 5 Drawing Sheets

CONNECTOR AND METHOD FOR SEALED PASS-THROUGH OF INSULATED ELECTRICAL CONDUCTORS

FIELD OF THE INVENTION

The invention relates to the field of electrical connectors, and more particularly to a pass-through connector and method for passing insulated electrical conductors such as pins or multi-stranded wires through a surface or bulkhead.

BACKGROUND OF THE INVENTION

The electrical systems of automobiles, boats, aircraft, and other vehicles present numerous wiring problems. It is often necessary that wires must run through compartments without introducing environmental leakage between or from the compartments. Devices and methods for passing electrical wiring through a surface such as a wall or bulkhead are frequently sought. The connections between in-tank fuel pumps and fuel level sensors to the electrical wiring harness outside of the fuel tank are especially problematic, because the openings in the gas tank, through which the wires must pass, pose leakage problems due to pressurized gas vapors and capillary seepage of liquid fuel along the insulated wires.

In the manufacture of automotive fuel tanks, a current practice is to rivet brass posts perpendicularly through round holes in a steel plate which is subsequently fastened to a larger opening in the fuel tank. The posts themselves are sealed to the steel plate by tight attachment through individual plastic grommets. A further plastic shell is assembled in the area of the posts to aid subsequent attachment of electrical wires and to protect the posts from mechanical damage. Wires are simultaneously connected to the posts on the other side of the plate during riveting, and this is facilitated by crimping eyelets beforehand to the end of the wires which are slipped over the posts prior to riveting the posts to the plate. The wires are then connected inside the tank to the fuel pump and level sensor. Outside of the tank, wires must be attached to the posts after the tank is mounted to the automobile.

One problem with the current practice of fuel tank connections is that a blind connection is required. The hook-up is typically made between the harness wiring and in-tank devices without the installer being able to see precisely which connections are being made. The connection also creates servicing problems because the tank must often be removed during servicing of the vehicle, requiring disconnection of the wires from the posts.

Although the use of "jumper" wires or short wires connected to the posts prior to installation of the fuel tank might solve the blind attachment and service problems, another connection is required along the electrical path between the jumpers and the wire harness. Additional connections are not particularly desirable. Every connection tends to degrade the electrical integrity of the system and to increase costs.

Jumper wires are normally used either wholly within the fuel tank or outside of it, and therefore do not solve the problem of capillary seepage, which in current applications results from fuel seeping between the perpendicular posts and the plastic grommets and between the plastic grommets and the steel plate.

A further seepage problem arises when stranded wire is passed through a grommet, because leak paths around and between the strands may be created due to the flexible movement of the stranded wire.

A connector is therefore required for passing insulated electrical conductors through a surface or bulkhead while preventing leakage of liquids and gases.

SUMMARY OF THE INVENTION

In surmounting the disadvantages of the prior art, the invention provides a connector for passing insulated electrical conductors through a surface, bulkhead, or mounting structure while preventing the capillary seepage of liquids and the efflux of pressurized gases. In an exemplary embodiment, a connector is provided which comprises a hard body having openings in which a sealant is placed and allowed to cure around stripped sections of passed-through insulated multi-stranded wires. A seal is therefore created around and between the strands. The strands may be further compressed into a tight geometry to deform the strand shapes and minimize gaps between the strands. The compression of the strands may also be used to control the manner in which the sealant is wicked into and flowed through the strand bundle. Strain relief members supported the insulated wires on either side of the body immediately adjacent to the seal-zone openings. An O-ring and annularly spaced clasp members are located circumferentially around the seal-zone openings and strain relief members to permit the connector to be removably twist-locked onto a bulkhead or port without weakening the integrity of the seal-zone.

The invention also provides a method by which the pass-through of electrical conductors is obtained. An exemplary method involves stripping a cylindrical section of insulated multi-stranded wires, compressing the exposed bundle into a tight geometry in the openings of the body to minimize gaps between the strands, and applying a sealer and allowing it to cure.

DESCRIPTION OF THE DRAWINGS

A more complete understanding of the present invention and the attendant advantages and features thereof will be more readily understood by reference to the following detailed description when considered in conjunction with the accompanying drawings, wherein.

DETAILED DESCRIPTION OF THE INVENTION

Figure 1:
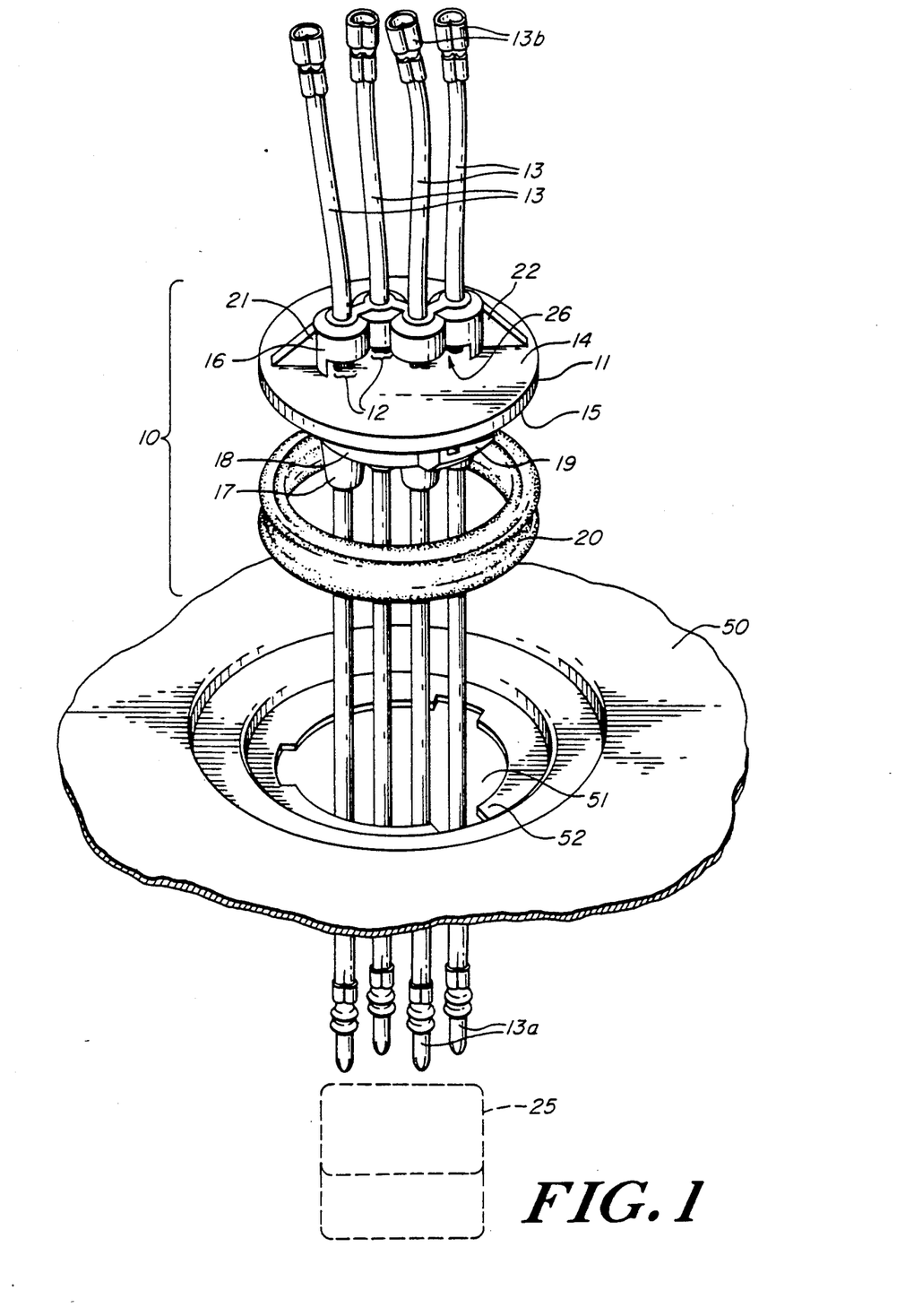
FIG. 1 is an exploded perspective view of the connector, O-ring seal, and mounting hole of the invention.

Referring now to the drawings, wherein like numerals are used throughout to designate corresponding features, FIG. 1 shows a connector 10 in an exemplary embodiment of the invention which comprises a body 11 having seal-zone openings designated generally as at for permitting continuous insulated electrical conductors 13, such as multi-stranded wire, to pass through the body 11 while providing a seal to prevent capillary seepage of fluid and efflux of gases around and between strands. While bared wire strand are shown in the seal-zone openings 12, the invention may also be used with other electrical conductors, such as single-stranded wire, pins, tubes, or rods. The use of the sealant with the bared section of such electrical conductors provides advantages even though multi-strands are not involved, because capillary leakage due to fuels or pressurized gases still poses a problem for the seal-zone between the body (opening) and conductor (whether insulated or bared). The insulated conducts may be terminated by pin terminals such as plugs 13a or jack ends 13b.

The pass-through body 11, which is preferably made of hard material such as plastic or other electrically insulating substance, is comprised of a first side 14 and a second side 15 with seal-zone openings 12 which pass through from one side to the other. The material which comprises the pass-through body 11 prevents direct shorting of the wires to the steel plate or other metallic bodies. In an exemplary embodiment of the invention, the body 11 has a generally flat shape which is parallel to the surface 50 upon which the connector 10 is mounted and through which electrical conductors 13 are passed. Strains relief members 61 and 17 connected to both sides of the body 11 provide strain relief to the insulated conductors 13 passing through the seal-zone openings 12. Strain relief is provided longitudinally along the wires as well as transversely (or axially) when the connector is twist-locked into a bulkhead or surface port 50. A protruding or raised annular portion 18 on the body 11 may be shaped to conform to the access port 51 or opening located on the surface or bulkhead 50 on which the connector 10 is to be mounted. The raised annular portion 18 may contain a locking mechanism 19, such as spaced clasping members or ledges 19, which lockably engage with corresponding annular flanges 52 in the access port 51. A sealant member, such as a gasket or preferably an O-ring 20 comprised of elastomeric material such as nitrile, which is the preferred material for providing resistance to gasoline, permits a liquid- and gas-proof seal between the body 11 and surface 50. The locking mechanism 19 is preferably configured to permit the connector 10 to be removably twist-locked to the surface 50. The sealant member 20 and locking mechanism 19 can be located on either side of the body 11.

Braces 21 and 22 provide structural support to the strain relief members 16 under which an access channel 26 is provided for the purpose of facilitating the application of a sealant into the seal-zone openings 12 containing the bared conductors. The access channel 26 also permits the wires to be compressed together to minimize gaps between the strands.

Figure 2:
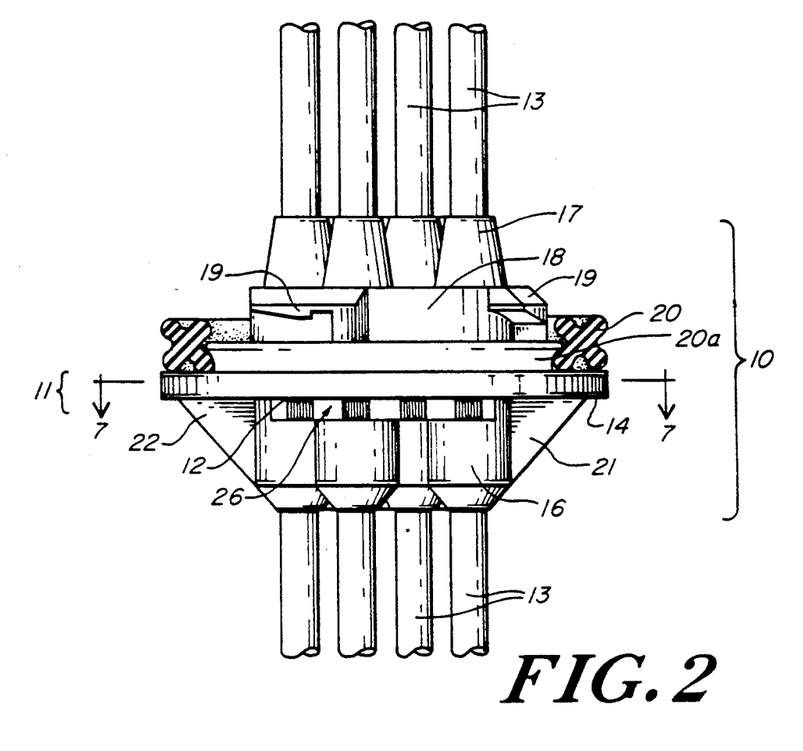
FIG. 2 is a side view of the connector along a plane parallel to the plane of a surface to which the connector is mounted.

FIG. 2 is a side view of the connector 10 wherein an O-ring 20 is held on the body 11 by an annularly grooved projection member 20a. The cross-section of the O-ring 20 is shown with a generally "x" shape, but other cross-sectional shapes, such as a round cross-sectional shape, may also be used. The side view of FIG. 2 further illustrates releasable locking clasp members 19 spaced around the annular raised portion 18. It also illustrates the manner in which the strain relief members 16 and 17 may be shaped as towers which gradually taper in diameter as the distance from the seal-zone openings 12 increases to provide gradual strain relief to the insulated conductors 13. The strain relief towers 16 and 17 are preferably melted or molded to provide a rudimentary seal with the insulation of the conductors 13. The insulation may be of high-density polyethylene or polypropylene. Other materials such as polyvinylchloride (PVC) may also be used.

Braces 21 and 22 located on side 14 of the body 11 provide manual means for axially twisting the connector to effectuate the twist-on locking of the connector 10 to the surface port (shown in FIG. 1).

Figure 3:
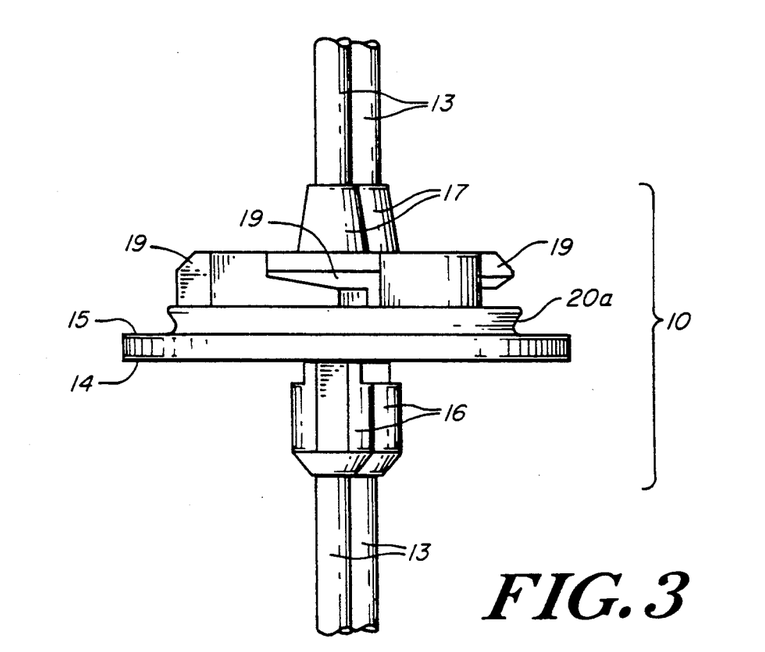
FIG. 3 is a further side view of the connector along the same plane shown in FIG. 2.

FIG. 3 shows the connector 10 of FIG. 2 without the O-ring. The shape of the annularly grooved projection member 20a, used for retaining an O-ring, may be more easily seen. The annular spacing of the releasable clasp members 19 is also known.

Figure 4:
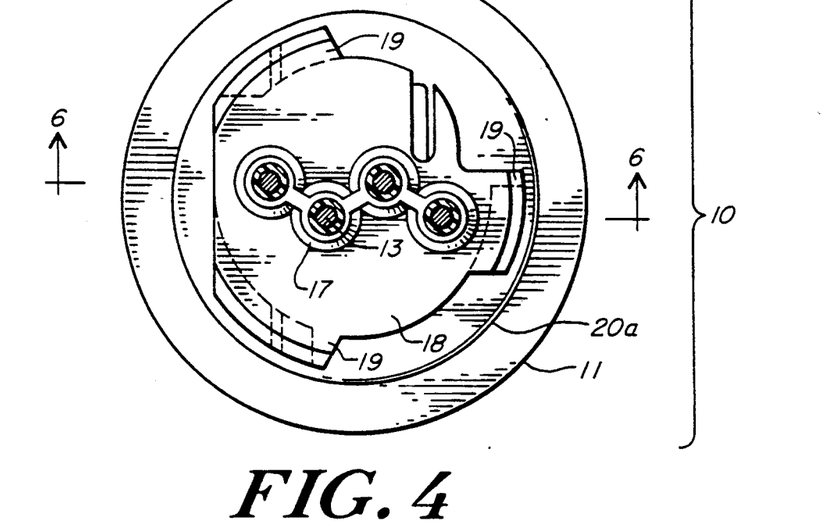
FIG. 4 is a top view of the connector.

FIG. 4 shows side 15 of the connector 10 in a view perpendicular to the plane of the body 11. In an exemplary embodiment of the invention, the body 11, the annularly grooved projection member 20a for retaining the O-ring (as seen in FIG. 2), and the annular raised portion 18 containing the clasp members 19 are preferably arranged as concentrically as possible on the body 11. The insulated conductors 13 and strain relief towers 17 are preferably placed close to the center of the body 11.

Figure 5:
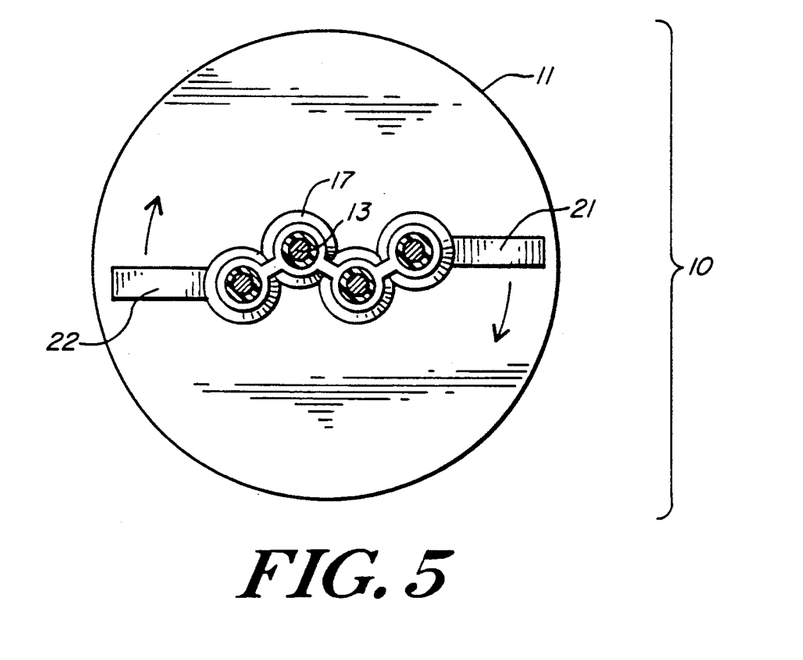
FIG. 5 is a bottom view of the connector.

FIG. 5 shows the other side 14 of the connector 10 in which braces 21 and 22 are diametrically opposed on either side of the centrally located passed-through conductors 13 and strain relief towers 17. The braces 21 and 22 may act as wing nuts to provide a structure for axially twist-locking the connector body 11 into a port or receptacle.

Figure 6:
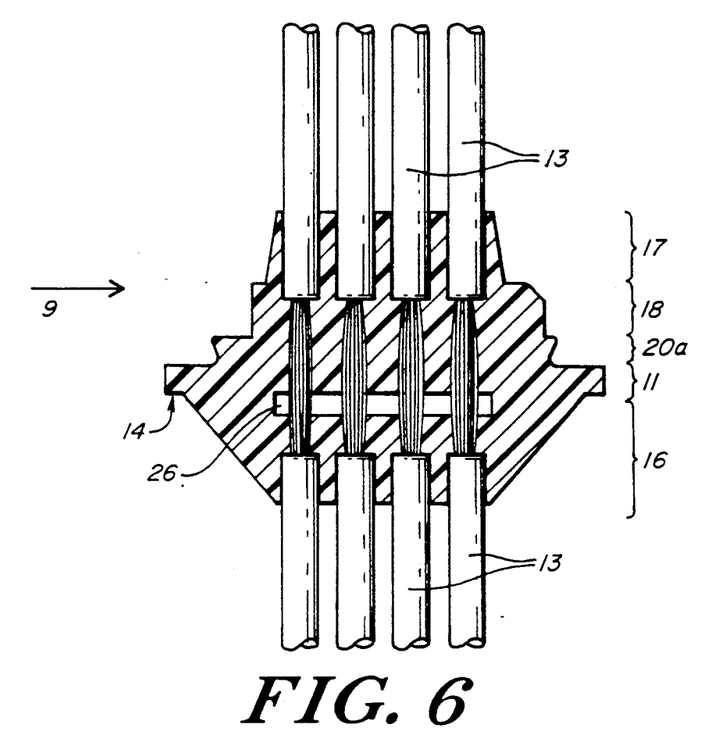
FIG. 6 is a cross-sectional view along line 6 of FIG. 4 showing the bared section of insulated conductors passing through the connector.

FIG. 6 is a cross-sectional view of insulated continuous multi-stranded electrical wire conductors 13 in an exemplary embodiment of the invention. The bared section of stranded wires shown are compressed along the plane of view. The cross-sectional profile of the body 11, annularly grooved projection members 20a, annular raised portion 18, and strain relief members/towers 16 and 17 suggest the structural integrity afforded to the passed-through conductors 13. A channel, designated generally as at 26 in FIGS. 2 and 6, allows application of sealant to the bared wires and provides access means for compressing wires together during molding of the body 11 and seal-zone openings 12. When the connector 10 is used in conjunction with fuel tanks or other compartments, the side 14 of the connector 10 having the channel 26 is preferably disposed inwardly of the fuel tank to prevent the bared wire sections from oxidizing.

Figure 7:
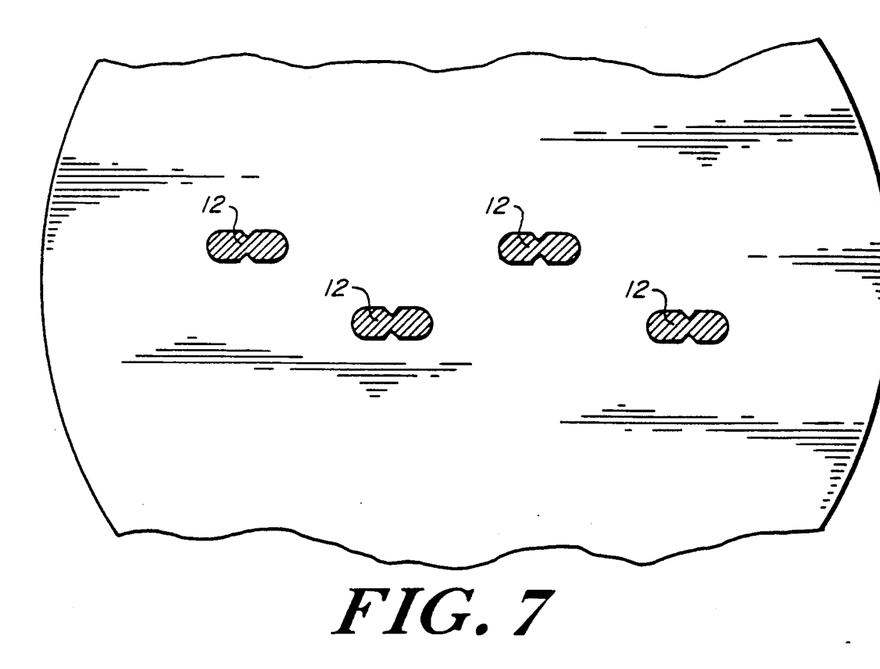
FIG. 7 is a cross-sectional view along line 7 of FIG. 2 showing the pass-through seal-zone openings in the connector.
Figure 8:
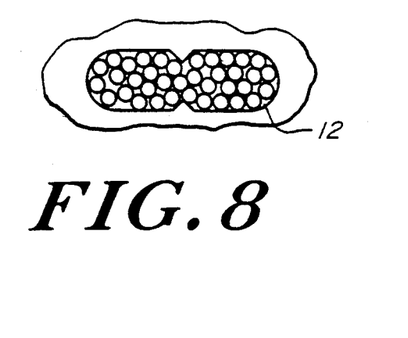
FIG. 8 is a cross-sectional view of one of the pass-through seal-zone openings as shown in FIG. 7 with multi-stranded wires compressed to conform tightly within the geometry of the pass-through seal-zone opening.

FIG. 7 shows seal-zone openings 12 in an exemplary embodiment of the invention which are generally rectangular in shape. FIG. 8 shows a magnified view of one of the openings 12 through which a bared multi-stranded wire is passed. A sealant is applied to the conductors 13 to prevent leakage of fluids and gases around the conductors 13 and, where multi-stranded wire is used, to prevent leakage through gaps between the strands. Preferably, the sealant is of the type which can be applied through wicking action.

Figure 9:
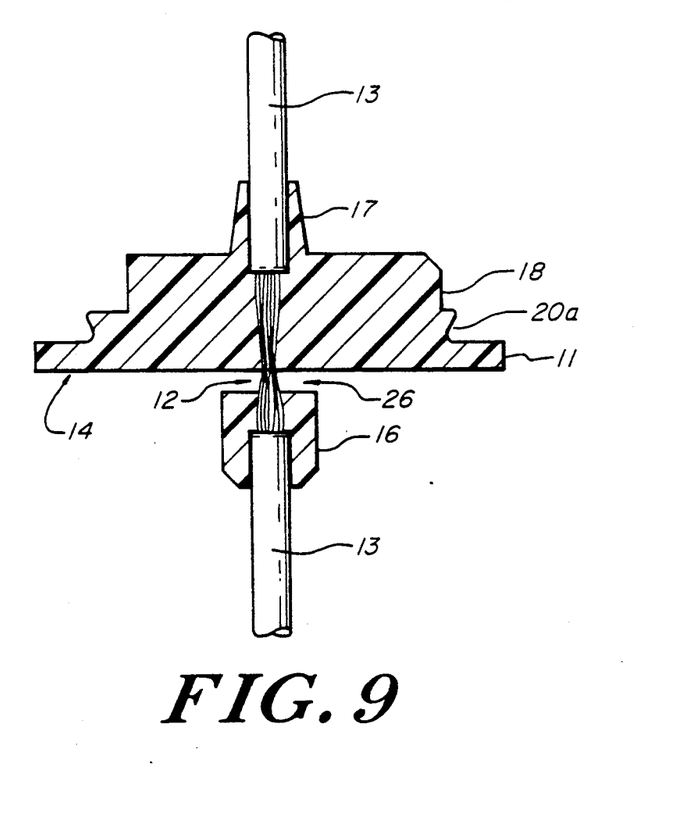
FIG. 9 is a cross-sectional view of the connector along line 9 of FIG. 6.

FIG. 9 is a side view of the connector along line 9 of FIG. 6. The insulated multistranded wire 13 has a bare section which spans the channel 26 between the strain relief member 16 and body 11. As the bare section enters the seal-zone openings 12 in the body 11, the bare wires are compressed or pinched together to minimize gaps between and around the strands.

The structural features and advantages of the invention may be further explained by a description of the exemplary methods by which the sealed pass-through of the electrical conductors is achieved. First, a conductor must be provided with center insulation that has been bared or stripped. Stripping a section of insulation will allow disposition of a sealer with capillary action to enter or to be injected into the body openings between the body and conductor. Where multi-stranded wire is used, the sealant must be able to flow between strands and wire bundles. Multi-stranded wire is preferred for its ability to flex and is expected to be most frequently used in the application of the invention.

Insulation may be removed by any means known in the art. This may include cutting the insulation, abrading off the insulation using stripping tools, and burning or melting the insulation using a heat source, such as a torch or laser.

Anaerobic sealer liquid, such as Loctite, is applied to the bare wire in the absence of air and allowed to cure. Copper wire is a preferable conductor because it acts as a catalyst for curing certain anaerobic sealers. Preferably, the sealer has both low surface tension for quick entry among the strands and thixotropicity in that it tends to cease diffusing beyond the point at which it is too thin to provide a seal membrane. A formula with high viscosity may require pressure to encourage movement of sealer into the wire bundle. The balance between fluidity and thickness is application dependent. In addition, heat may be used to cure the sealer.

In a further exemplary embodiment of the invention wherein multi-stranded wire is used, a preferred method of applying the sealer involves compressing or forging the strand bundles into a tight geometry to minimize gaps between strands. This helps to prevent capillary action from drawing out the sealer so thin that a barrier membrane cannot be formed. A preferred shape for the cross-section of the stripped wire bundle is a rectangle with V-notches piercing inward along the longer faces of the rectangle, as seen in FIGS. 7 and 8. The form or shape of the cross-section may vary in accordance with the wire and sealant used. In a further exemplary method of the invention, the wires may be stripped, inserted into the pass-through body as the openings are being molded around the inserted wires, and the wires compressed together at the same time.

The device and method of the invention is suited for use in automotive applications, and particularly for connecting an in-tank fuel pump and level sensors to the wire harness system of the automobile which is designated generally as at 25 in FIG. 1. The surface or bulkhead 50 shown in FIG. 1 may be connected to a plate which is attached to the fuel tank with the connector 10 disposed inward of the fuel tank such that pressure within the tank will press the body 11 against the O-ring 20 to contribute to the efficiency of the sealing. In fuel tank applications, it is required that the materials which comprise the connector 10, including the O-ring or other sealant member 20, be impervious to the fuel.

The invention is not to be limited by what has been particularly shown and described, except as indicated by the appended claims.

We claim:

1. A connector assembly for passing insulated electrical conductors through a surface, comprising:
   a body having a first side, a second side, and at least two spaced seal-zone openings for passing said insulated electrical conductors between said first and second sides,
   said insulated electrical conductors being located in and passing through said at least two spaced seal-zone openings, said insulated electrical conductors having sections located within said seal-zone openings which are bare of insulation;
   sealant located in said at least two spaced seal-zone openings;
   strain relief members for providing strain relief to said insulated electrical conductors adjacent said at least two spaced seal-zone openings on both of said body sides;
   a sealant member mounted on said body around said at least two spaced seal-zone openings and said strain relief members; and
   a lock mechanism for releasably mounting the body to the surface through which said insulated electrical conductors are passed.

2. The connector assembly of claim 1 wherein said insulated electrical conductors are wires.

3. The connector assembly of claim 2 wherein said wires are multi-stranded and said sealant located in said at least two spaced seal-zone openings is further located between strands.

4. The connector assembly of claim 3 wherein said strands passing through said at least two spaced seal-zone openings are bare and compressed together to form compressed bare strands and to minimize gaps between strands and said sealant is further located between said compressed bare strands.

5. The connector assembly of claim 4 wherein said compressed bare strands are compressed in a generally rectangular cross-sectional shape and said at least two spaced seal-zone openings are correspondingly conformed tightly to said compressed bare strands.

6. The connector assembly of claim 5 wherein said generally rectangular cross-sectional shape of said compressed bare strands further comprises V-notches along two longer faces of said generally rectangular cross-sectional shape, and said at least two spaced seal-zone openings are correspondingly shaped to conform tightly to said compressed bare strands.

7. The connector assembly of claim 1 wherein said electrical conductors are pin-shape.

8. The connector assembly of claim 1 wherein said electrical conductors are tubular-shape.

9. The connector assembly of claim 1 wherein insulation of said insulated electrical conductors is one of high density of polyethylene and polypropylene.

10. The connector assembly of claim 1 wherein said body is made of plastic.

11. The connector assembly of claim 1 wherein said body is further comprised of a flat surface conforming to said surface through which said electrical conductors are passed.

12. The connector assembly of claim 1 wherein said sealant is curable by anaerobic means.

13. The connector assembly of claim 1 wherein said sealant is comprised of material which is applied by flowing means.

14. The connector assembly of claim 1 wherein said strain relief members are connected to said body and have extended portions for enclosing said insulated electrical conductors adjacent said seal-zone openings.

15. The connector assembly of claim 14 wherein said extended portions of said strain relief member enclosing said insulated electrical conductors are tapered.

16. The connector assembly of claim 1 wherein said strain relief members are shaped as towers.

17. The connector assembly of claim 1 further comprising a raised annular member on said body for mounting said sealant member.

18. The connector assembly of claim 1 wherein said sealant member further comprises an elastomeric O-ring.

19. The connector assembly of claim 1 wherein said body, insulation of said insulated electrical conductors, said strain relief members, said sealant member, and said locking mechanism are made of material which is impervious to gasoline.

20. The connector assembly of claim 1 wherein said insulated electrical conductors are terminated with pin terminals.

21. The connector assembly of claim 1 wherein said locking mechanism comprises a raised annular member having spaced clasps for rotatably engaging said connector assembly in a hole which has flanges corresponding to said spaced clasps for twist-lockably engaging said connector assembly at said flanges.

22. The connector assembly of claim 21 further comprising a receptacle port for twist-lockably receiving said raised annular member, said receptacle port having spaced flanges for engagement with said spaced clasps of said raised annular member, whereby said connector assembly is twist-lockably engaged.

23. The connector assembly of claim 1 wherein said body and said strain relief members located on one of two said body sides form an access port.

24. A method for passing continuous insulated electrical conductors through a surface, comprising the steps of:
   providing a body having a first side, a second side, and at least two spaced seal-zone openings for passing electrical conductors through said body from one side to the other side;
   providing continuous insulated electrical conductors;
   baring insulation from a section of said electrical conductors and inserting the bared section through said seal-zone openings;
   applying sealer to said seal-zone openings containing said bare sections of said conductors and allowing said sealer to cure therein;
   providing strain relief to the insulated electrical conductors passing through said seal-zone openings; and
   providing means for locking and sealing said body to the surface through which the electrical conductors are passed.

25. The method of claim 24 wherein the step of providing continuous insulated electrical conductors comprises providing multi-stranded wire, and further comprises allowing the sealant to fill gaps between strands thereof.

* * * * *

UNITED STATES PATENT AND TRADEMARK OFFICE
CERTIFICATE OF CORRECTION

PATENT NO. : 5,170,017
DATED : December 8, 1992
INVENTOR(S) : Kenneth W. Stanevich, et al.

It is certified that error appears in the above-indentified patent and that said Letters Patent is hereby corrected as shown below:

Column 3, line 35, "61" should read --16--.

Column 5, line 65, "efficiency" should read --efficacy--.

Signed and Sealed this

Twenty-sixth Day of April, 1994

*Attest:*

BRUCE LEHMAN

*Attesting Officer*   *Commissioner of Patents and Trademarks*